United States Patent
Vora et al.

(10) Patent No.: US 9,303,760 B2
(45) Date of Patent: Apr. 5, 2016

(54) SYSTEM AND METHOD OF CONTROLLING SHIFTS OF AN ELECTRONICALLY CONTROLLED MECHANICAL TRANSMISSION OF A VEHICLE

(71) Applicant: CNH Industrial America LLC, New Holland, PA (US)

(72) Inventors: Kushan Vora, Westmont, IL (US); Garth H. Bulgrien, Ephrata, PA (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/298,606

(22) Filed: Jun. 6, 2014

(65) Prior Publication Data

US 2015/0354699 A1    Dec. 10, 2015

(51) Int. Cl.
*G06F 17/00*  (2006.01)
*F16H 61/04*  (2006.01)
*F16H 61/02*  (2006.01)
*F16H 47/02*  (2006.01)

(52) U.S. Cl.
CPC ............ *F16H 61/0437* (2013.01); *F16H 47/02* (2013.01); *F16H 61/0204* (2013.01); *F16H 2061/0425* (2013.01)

(58) Field of Classification Search
None
See application file for complete search history.

(56) References Cited

U.S. PATENT DOCUMENTS

| | | | |
|---|---|---|---|
| 3,969,958 A * | 7/1976 | Miyao et al. | 475/82 |
| 4,187,739 A * | 2/1980 | Hamma et al. | 74/733.1 |
| 4,228,700 A | 10/1980 | Espenschied et al. | |
| 4,766,779 A * | 8/1988 | Massy | 74/731.1 |
| 4,776,233 A * | 10/1988 | Kita et al. | 475/76 |
| 4,939,954 A * | 7/1990 | Walzer et al. | 74/733.1 |
| 4,947,687 A | 8/1990 | Martini et al. | |
| 5,133,230 A | 7/1992 | Ito et al. | |
| 5,207,736 A * | 5/1993 | Fredriksen | 74/730.1 |
| 5,323,667 A | 6/1994 | Tweed et al. | |
| 5,678,463 A * | 10/1997 | Brambilla et al. | 74/733.1 |
| 5,823,072 A | 10/1998 | Legner | |
| 5,848,370 A | 12/1998 | Kozaki et al. | |
| 6,272,950 B1 * | 8/2001 | Braun et al. | 74/731.1 |
| 6,332,860 B1 | 12/2001 | Hubbard et al. | |
| 6,471,619 B2 * | 10/2002 | Nanri et al. | 477/52 |
| 6,481,314 B2 * | 11/2002 | Nemoto et al. | 74/733.1 |
| 6,519,937 B2 * | 2/2003 | Nanri et al. | 60/327 |
| 7,354,368 B2 * | 4/2008 | Pollman | 475/72 |
| 7,686,737 B2 * | 3/2010 | Nishi et al. | 477/115 |
| 8,414,454 B2 * | 4/2013 | Nishi et al. | 477/52 |
| 8,986,162 B2 * | 3/2015 | Dix et al. | 477/68 |
| 2002/0091035 A1 | 7/2002 | Monowa et al. | |
| 2008/0064567 A1 | 3/2008 | Kue et al. | |
| 2012/0065854 A1 | 3/2012 | Stoller et al. | |
| 2012/0232764 A1 | 9/2012 | Inagawa et al. | |
| 2013/0090818 A1 | 4/2013 | Fujii et al. | |

FOREIGN PATENT DOCUMENTS

DE    9318017 U1    3/1995
EP    1 806 522 A2    11/2006

* cited by examiner

*Primary Examiner* — Dirk Wright
(74) *Attorney, Agent, or Firm* — Patrick M. Sheldrake

(57) ABSTRACT

A method of shifting a transmission of a vehicle. The method includes the steps of: initiating a shift from a first gear to a second gear in the transmission; disengaging a first clutch associated with the first gear; engaging a second clutch associated with the second gear; and actively modifying a pump displacement and/or a motor displacement while the disengaging step or the engaging step are carried out. The motor is drivingly coupled to the transmission.

14 Claims, 4 Drawing Sheets

SYSTEM AND METHOD OF CONTROLLING SHIFTS OF AN ELECTRONICALLY CONTROLLED MECHANICAL TRANSMISSION OF A VEHICLE

BACKGROUND OF THE INVENTION

1. Field of the Invention

The present invention relates to a hydro-mechanical transmission of a vehicle, and, more particularly, to the controlling of the shifting process of a hydro-mechanical transmission in a vehicle such as a combine.

2. Description of the Related Art

Agricultural vehicles utilize transmissions to change gear ratios to drive the vehicle over the ground at various speeds. The transmission of a heavy piece of equipment such as an agricultural harvester, also known as a "combine", has to be effectively shifted in order to achieve a required ground speed and torque to perform required harvesting operations without any operator discomfort. A combine is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, the engine, by way of the transmission provides power to the drive wheels or tracks of the vehicle. In order to achieve required speed and torque during machine operation, up and down shifting of the transmission is carried out by swapping clutch engagements. In order to achieve a large speed range, the difference of output to input gear ratios for first and second gear is generally significantly large (usually the output to input gear ratio for second gear is more than twice the gear ratio of the first gear). Due to this large difference in the gear ratios, the task of shifting gears without interruption in vehicle speed felt by the operator driving the vehicle becomes very critical. Such shifting can lead to a jerk of the vehicle, which can impact the comfort of the operator and other systems of the vehicle.

What is needed in the art is a shifting algorithm that shifts the transmission in a smooth and efficient manner.

SUMMARY OF THE INVENTION

The present invention provides a system and method of controlling the shifts of an electronically controlled hydro-mechanical transmission by swapping clutches, as well as actively altering the displacements of a pump and motor of the transmission at the same time.

The invention in one form is directed to a method of shifting a transmission of a vehicle. The method includes the steps of: initiating a shift from a first gear to a second gear in the transmission; disengaging a first clutch associated with the first gear; engaging a second clutch associated with the second gear; and actively modifying a pump displacement and/or a motor displacement while the disengaging step or the engaging step are carried out. The motor is drivingly coupled to the transmission.

The invention in another form is directed to an agricultural vehicle including a chassis, an engine carried by the chassis, a pump driven by the engine, a motor driven by the pump, a transmission shift control system that controls the displacement of the pump and the motor, and a transmission driven by the motor. The transmission has a first gear, a second gear, a first clutch arrangement associated with the first gear, and a second clutch arrangement associated with the second gear. The transmission shift control system is configured to execute the steps of: initiating a shift from the first gear to the second gear in the transmission; disengaging the first clutch associated with the first gear; engaging the second clutch associated with the second gear; and actively modifying the displacement of the pump and/or the displacement of the motor while the disengaging step and the engaging step are being carried out.

The invention in yet another form is directed to a transmission shift control system for an agricultural vehicle having a chassis, an engine carried by the chassis, a pump driven by the engine, a motor driven by the pump, the transmission shift control system that controls the displacement of the pump and the motor, the transmission shift control system including a transmission driven by the motor, the transmission having a first gear, a second gear, a first clutch arrangement associated with the first gear, and a second clutch arrangement associated with the second gear. The transmission shift control system is configured to execute the steps of: initiating a shift from the first gear to the second gear in the transmission; disengaging the first clutch associated with the first gear; engaging the second clutch associated with the second gear; and actively modifying the displacement of the pump and/or the displacement of the motor while the disengaging step and the engaging step are being carried out.

The present invention advantageously provides a smooth and efficient shift between gears having a substantial difference in gear ratios.

Another advantage is that the shift is carried out while ignoring input from the operator that could otherwise compromise the effectiveness of the shift.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE INVENTION

Figure 1:
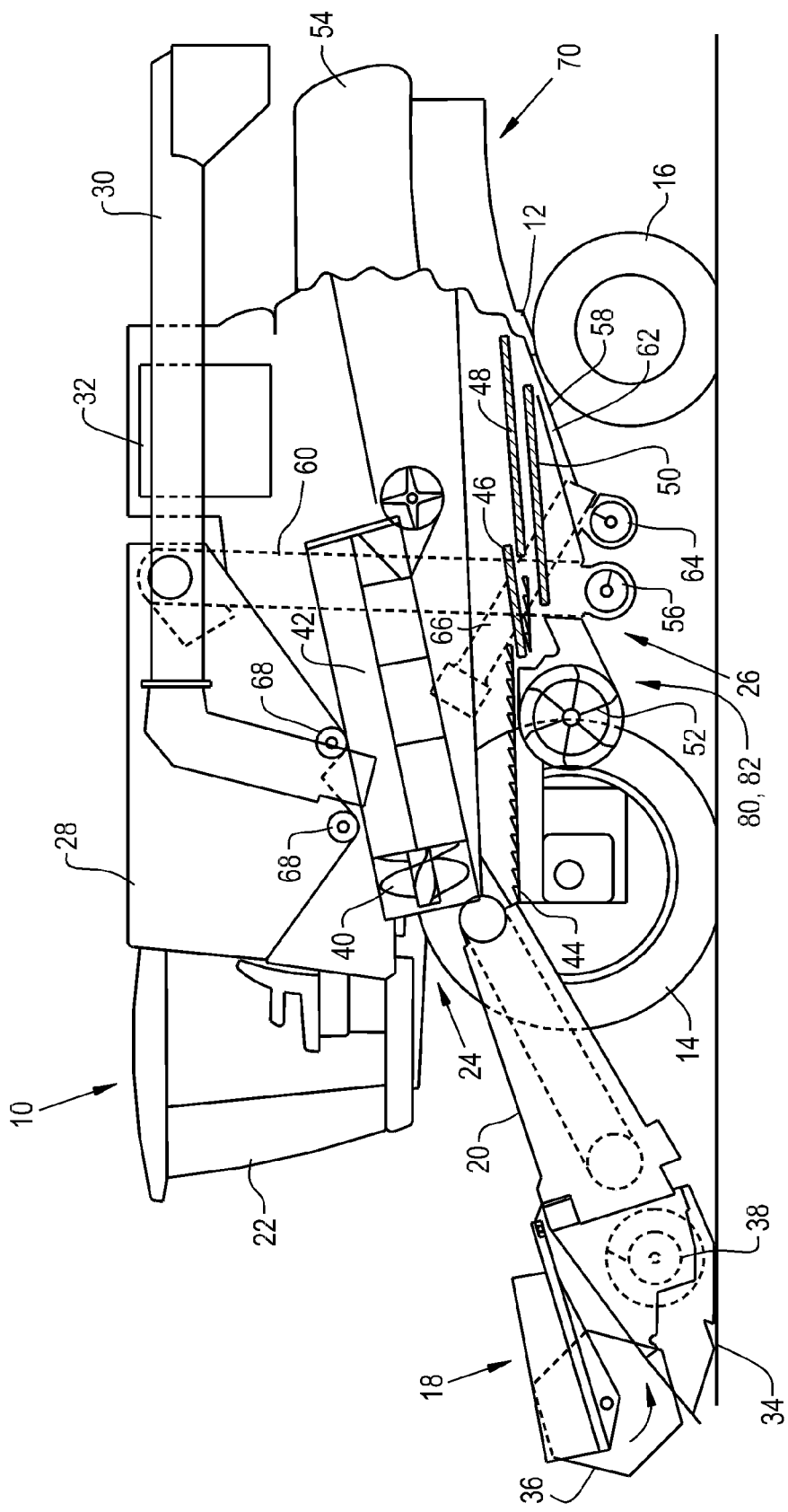
FIG. 1 is a side view of an embodiment of an agricultural harvester in the form of a combine which includes an embodiment of a transmission configured to shift by way of a transmission shift control system according to the present invention.

Referring now to the drawings, and more particularly to FIG. 1, there is shown an agricultural vehicle 10 in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and an electronically controlled mechanical transmission 80. Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10. The non-grain crop material proceeds through a residue handling system 70.

Figure 2:
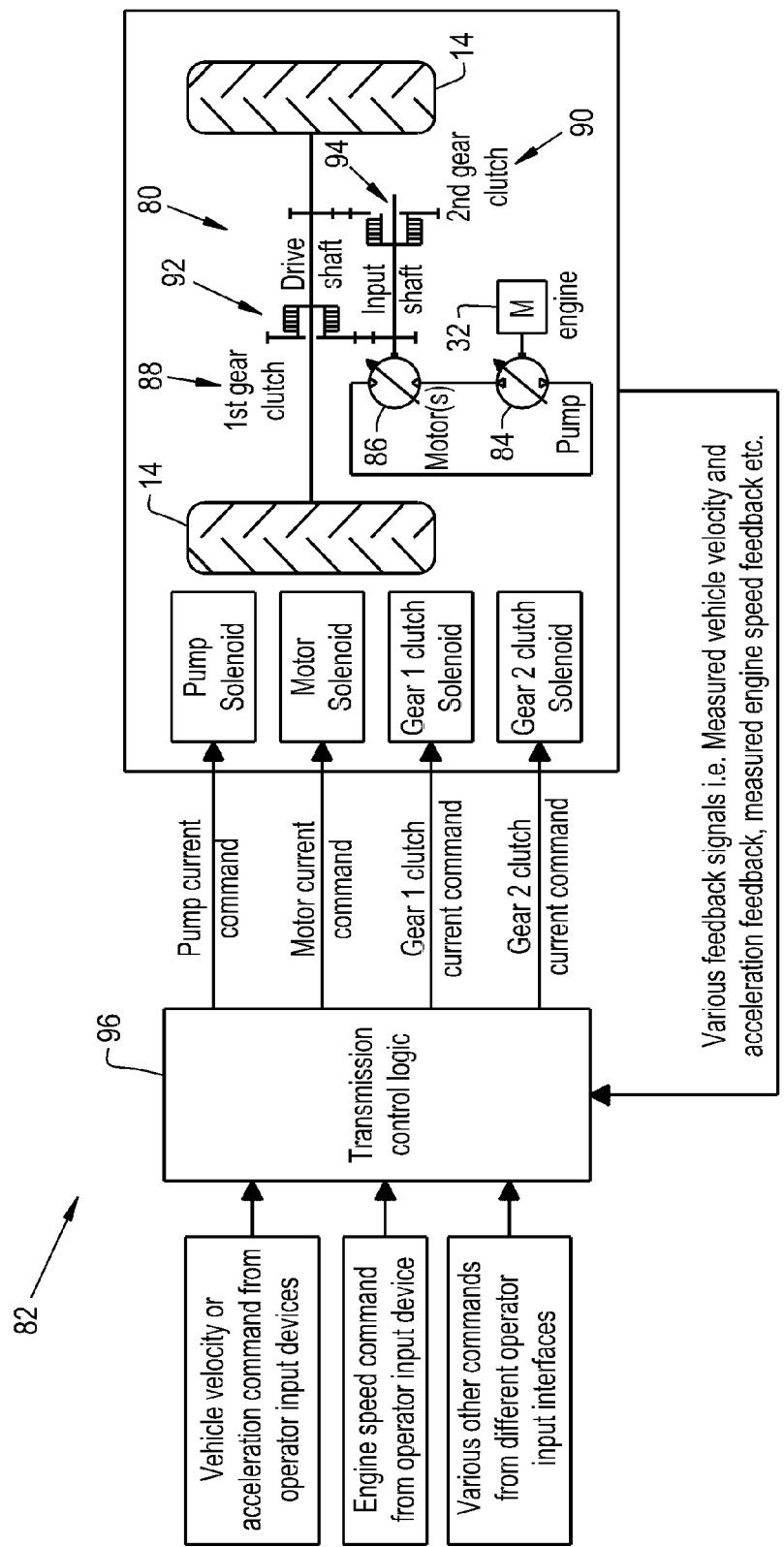
FIG. 2 is a schematic illustration of an electronically controlled hydro-mechanical transmission along with a transmission control system contained in the combine of FIG. 1.
Figure 3:
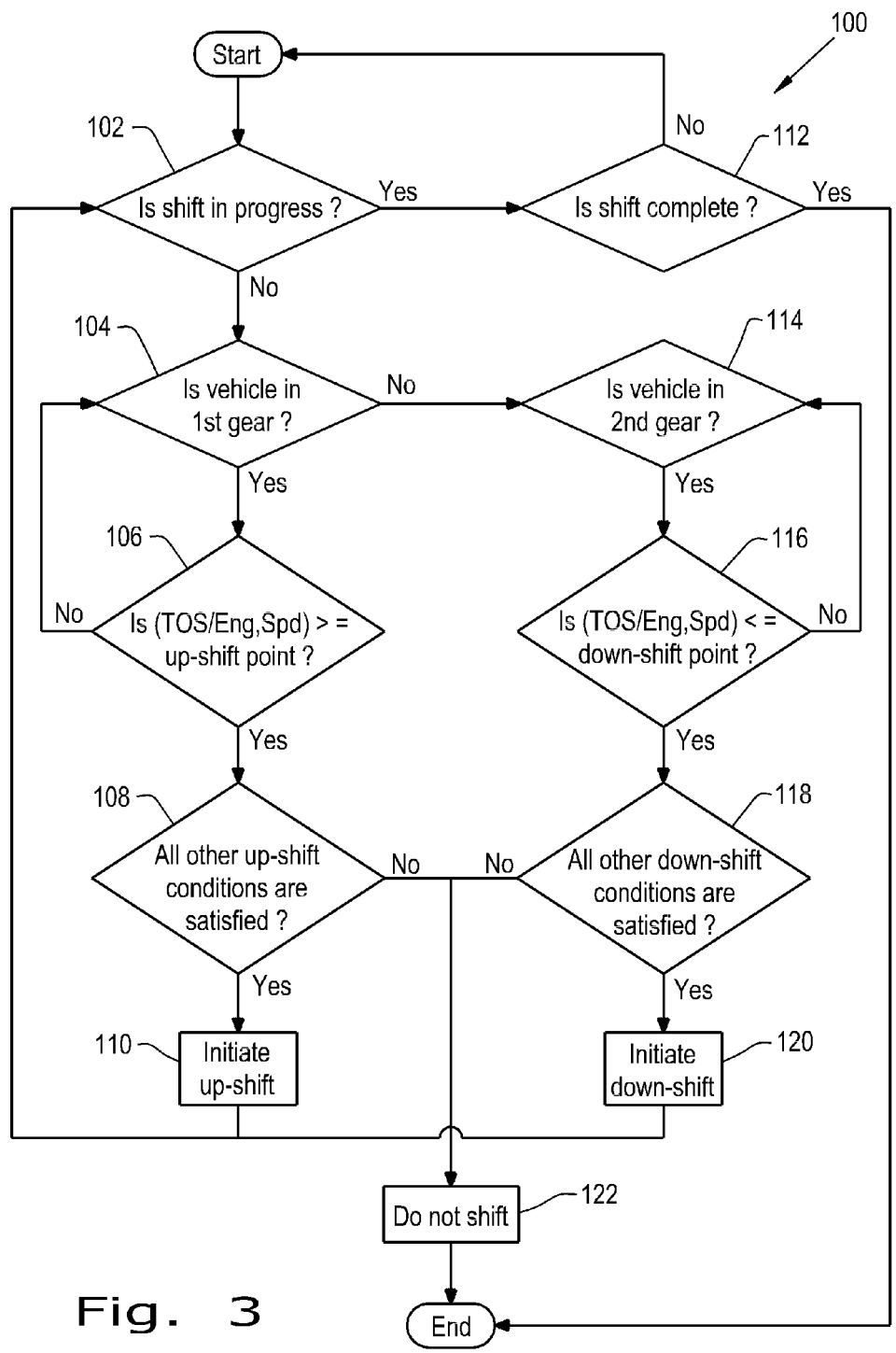
FIG. 3 is a flowchart describing a transmission shift decision making process for the transmission shift control logic that is part of the transmission control system of FIG. 2.
Figure 4:
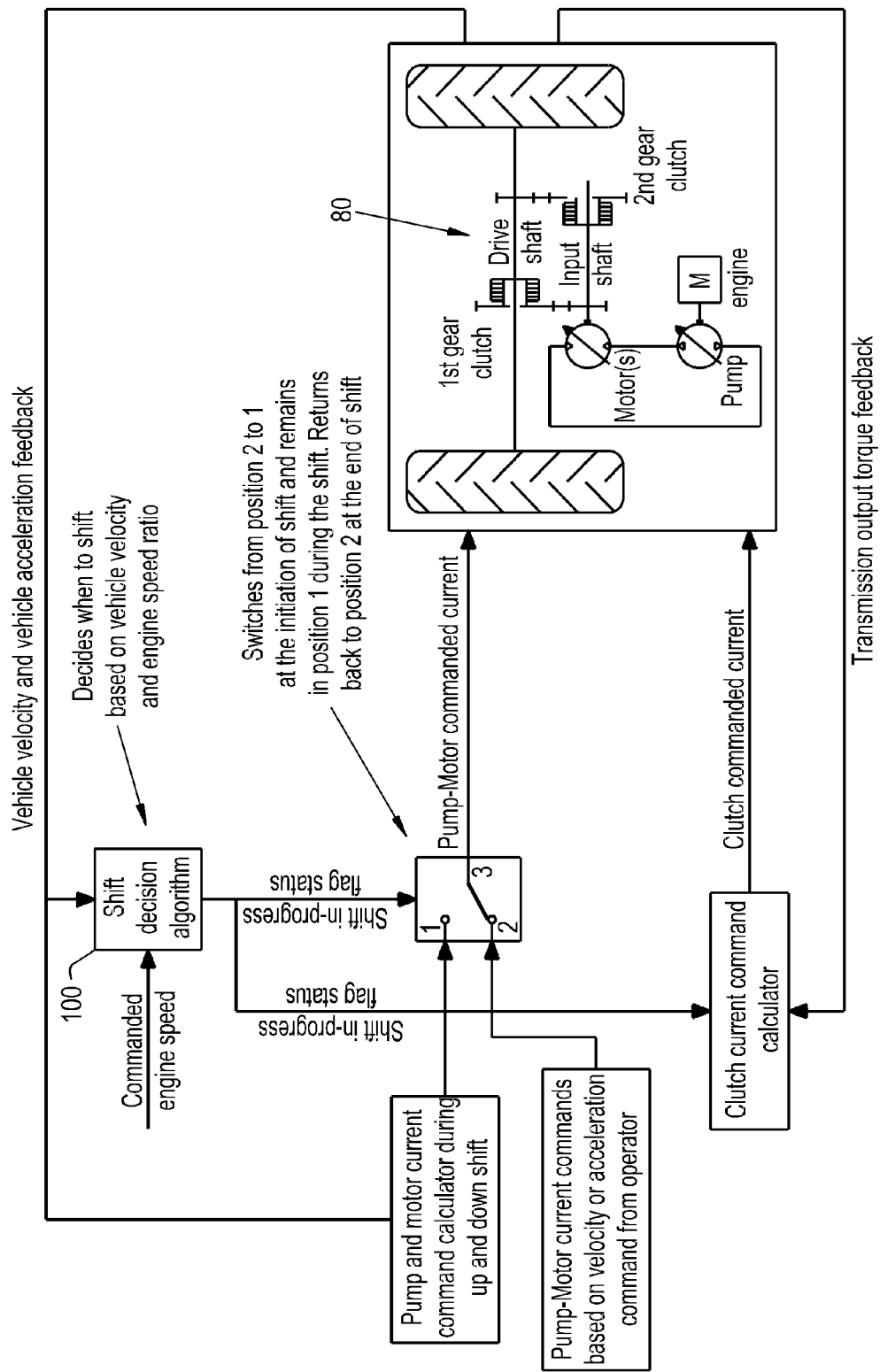
FIG. 4 is a schematical representation of the transmission shift control logic that is part of the transmission control system of FIG. 2.

Now, additionally referring to FIGS. 2-4, there are shown more details of electronically controlled mechanical transmission 80 and transmission control system 96, together broadly understood to be a shifting system 82. Shifting system 82 includes electronically controlled mechanical transmission 80, an electronically controlled variable displacement pump 84, solenoids that control the displacement of pump 84, an electronically controlled variable displacement motor 86, solenoids that control the displacement of motor 86. Electronically controlled mechanical transmission 80 includes a clutch 88, a clutch 90, a gear 92 and a gear 94. There are solenoids associated with clutches 88 and 90 that control the engagement of clutches 88 and 90. Although referred to as gears 92 and 94 this is used to refer to gear ratios 92 and 94 with more than one gear likely being involved with each gear ratio. It is also to be understood that other drive mechanisms are also contemplated, yet are herein referred to as gears although pulleys or other devices may be employed. Additionally, even though referred to as a first gear and a second gear in the claims, this it just to differentiate the gears and not to refer to a numbered gear in transmission 80.

Pump 84 is drivingly connected to engine 32. Pump 84 drives motor 86, which in turn drives an input shaft of electronically controlled mechanical transmission 80. The displacements of pump 84 and motor 86 are controlled by changing the swash plate angle, by altering the current to the solenoids associated with pump 84 and motor 86, as illustrated in FIG. 2. The solenoids are control by the transmission shift control logic, which is part of transmission shift control system 96, which may be considered a controller 96. Transmission shift control logic, which is part of controller 96 controls the engagement of clutches 88 and 90 by way of controlling current to the solenoids of the proportional control valves. The transmission shift control logic receives input from sensors that determine the velocity and acceleration commands from the operator, the speed of engine 32 and other various input signals. The transmission shift control logic also receives feedback signals, such as vehicle velocity and/or vehicle acceleration from the components of vehicle 10 including transmission 80.

A method 100 for determining if a shift is to be made is illustrated in FIG. 3. In method 100, at step 102 a decision is made as to whether a shift is in progress, if the answer is "No", then it determines if transmission 80 of vehicle 10 is in one gear or another at steps 104 and 114. If transmission 80 is in the $1^{st}$ gear, then a further evaluation is made at step 106 as to whether the transmission output speed (TOS)/Engine speed ratio is greater than a predetermined up-shift point, if so, and all other shift conditions are met at step 108, then an upshift is initiated at step 110.

In a similar manner if transmission 80 of vehicle 10 is in $2^{nd}$ gear and the TOS/Engine speed ratio is less than the down-shift point (step 116) and all other down-shift conditions are satisfied at step 118, then a down-shift is initiated at step 120. At the beginning of method 100 if a shift is in progress then method 100 transitions to step 112 until the shift is complete, hence ignoring inputs, such as those from steps 106, 108, 116, and 118, as well as operator inputs until the shift has been completed.

The present invention uses a combination of feed-forward and feedback control methods to achieve minimum transmission output speed interruption felt by the operator driving vehicle 10 while gear shifting progresses in electronically controlled 2-speed electronically controlled mechanical transmission 80. The displacements of pump 84 and motor 86 and the engagement-disengagement of gear clutches 88 and 90 are controlled by the transmission shift control logic in electronic control unit 96 based on various inputs, such as operator commands, measured torque going through the transmission, measured vehicle speed and/or acceleration, measured pressure between pump and motor in the hydraulic circuit, engine speed etc.

As shown in FIG. 3, a shift is commanded based on the value of the transmission output speed (TOS) to engine speed ratio. At the initiation of a shift, the actuator associated with the oncoming clutch 88 or 90 is actuated until a (kiss) point occurs, in that the clutch starts transmitting torque without any further increase in current to the solenoid, which activates the actuator associated with that particular clutch. The increase-decrease rate, magnitude and crossover point of on-coming and off-going clutch current to the solenoids during shifts is determined based on the required output torque of transmission 80. During the shift, pump and motor displacements are purely calculated based on vehicle velocity and/or acceleration feedback and engine speed independent of vehicle velocity or acceleration commands from the operator driving vehicle 10.

The pump and motor displacements are increased or decreased during the shift using vehicle velocity and/or acceleration feedback in order to maintain the desired acceleration or deceleration and/or velocity of vehicle 10. Additionally, pump and motor commands compensate for a detected or anticipated increase in vehicle velocity during up-shift and conversely a decrease in vehicle velocity during down-shifts.

Once a target transmission output speed to motor speed ratio is achieved, the shift is considered to be completed. The shift-in-progress flag goes low, which then transfers control back to the machine operator. Pump and motor displacements are now again a function of velocity or acceleration commands given by the machine operator apart from the present invention, since the shift is completed.

The present invention advantageously incorporates a combined open and closed loop control method for controlling the shifting of a hydro-mechanical transmission, which has a variable displacement pump and a variable displacement motor in series with electronically controlled mechanical transmission of a vehicle. The control method includes controlling the clutches based on estimation or measurement of required transmission output torque and controlling the pump and/or motor displacements based on a difference of gear ratio associated with on-coming and off-going clutches, measured vehicle velocity and/or acceleration feedback and engine speed during the up or down shift of the transmission.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of shifting a transmission of a vehicle; the method comprising the steps of:
   initiating a shift from a first gear to a second gear in the transmission;
   disengaging a first clutch associated with said first gear;
   engaging a second clutch associated with said second gear; and
   actively modifying at least one of a pump displacement and a motor displacement while at least one of said disengaging step and said engaging step are being carried out, said motor being drivingly coupled to the transmission; and
   calculating pump commands and motor commands dependent upon a feedback signal of at least one of a speed of the vehicle, an acceleration of the vehicle and an engine speed, said pump commands and said motor commands being used to respectively change said pump displacement and said motor displacement;
   wherein said calculating commands step compensates for an increase in vehicle velocity during an up-shift and a decrease in vehicle velocity during a down-shift by altering said pump commands and/or said motor commands.

2. The method of claim 1, wherein said actively modifying step actively modifies both said pump displacement and said motor displacement while said disengaging step and said engaging step are being carried out.

3. The method of claim 1, further comprising the step of monitoring an output speed of the transmission and a motor speed ratio to determine that the shift is complete and the method is completed.

4. The method of claim 1, further comprising a step of calculating pump commands and motor commands dependent upon a gear ratio difference of on-coming and off-going clutches, said pump commands and said motor commands being used to respectively change said pump displacement and said motor displacement.

5. A method of shifting a transmission of a vehicle, the method comprising the steps of:
   initiating a shift from a first gear to a second gear in the transmission;
   disengaging a first clutch associated with said first gear;
   engaging a second clutch associated with said second gear; and
   actively modifying at least one of a pump displacement and a motor displacement while at least one of said disengaging step and said engaging step are being carried out, said motor being drivingly coupled to the transmission; and
   calculating pump commands and motor commands dependent upon a feedback signal of at least one of a speed of the vehicle, an acceleration of the vehicle and an engine speed, said pump commands and said motor commands being used to respectively change said pump displacement and said motor displacement;
   wherein said calculating step ignores any vehicle velocity or acceleration commands from an operator driving the vehicle.

6. The method of claim 5, wherein said calculating step accommodates an acceleration change undertaken prior to said initiating step being executed.

7. An agricultural vehicle comprising:
   a chassis;
   an engine carried by said chassis;
   a pump driven by said engine;
   a motor driven by said pump;

a transmission shift control system in control of displacement of said pump and said motor; and a transmission driven by said motor, said transmission having:
  a first gear;
  a second gear;
  a first clutch arrangement associated with said first gear; and
  a second clutch arrangement associated with said second gear;

wherein said transmission shift control system is configured to execute the steps of:
  initiating a shift from said first gear to said second gear in the transmission;
  disengaging said first clutch associated with said first gear;
  engaging said second clutch associated with said second gear; and
  actively modifying at least one of a displacement of said pump and a displacement of said motor while at least one of said disengaging step and said engaging step are being carried out;

wherein said transmission shift control system is further configured to carry out the step of calculating pump commands and motor commands dependent upon a feedback signal of at least one of a speed of the vehicle, an acceleration of the vehicle and an engine speed, said pump commands and said motor commands being used to respectively change said pump displacement and said motor displacement;

wherein said calculating step compensates for an increase in vehicle velocity during an up-shift and a decrease in vehicle velocity during a down-shift by altering said pump commands and/or said motor commands.

8. The agricultural vehicle of claim 7, wherein said actively modifying step actively modifies both said pump displacement and said motor displacement while said disengaging step and said engaging step are being carried out.

9. The agricultural vehicle of claim 7, wherein said transmission shift control system is further configured to carry out the step of monitoring an output speed of the transmission and a motor speed ratio to determine that the shift is complete.

10. An agricultural vehicle comprising:
  a chassis;
  an engine carried by said chassis;
  a pump driven by said engine;
  a motor driven by said pump;
  a transmission shift control system in control of displacement of said pump and said motor; and
  a transmission driven by said motor, said transmission having:
    a first gear;
    a second gear;
    a first clutch arrangement associated with said first gear; and
    a second clutch arrangement associated with said second gear;

wherein said transmission shift control system is configured to execute the steps of:
  initiating a shift from said first gear to said second gear in the transmission;
  disengaging said first clutch associated with said first gear;
  engaging said second clutch associated with said second gear; and
  actively modifying at least one of a displacement of said pump and a displacement of said motor while at least one of said disengaging step and said engaging step are being carried out;

wherein said transmission shift control system is further configured to carry out the step of calculating pump commands and motor commands dependent upon a feedback signal of at least one of a speed of the vehicle, an acceleration of the vehicle and an engine speed, said pump commands and said motor commands being used to respectively change said pump displacement and said motor displacement;

wherein said calculating step ignores any vehicle velocity or acceleration commands from an operator driving the vehicle.

11. The agricultural vehicle of claim 10, wherein said calculating step accommodates an acceleration change undertaken prior to said initiating step being executed.

12. A transmission shift control system for an agricultural vehicle having a chassis, an engine carried by the chassis, a pump driven by the engine, a motor driven by the pump, the transmission shift control system being in control of displacement of the pump and the motor, the transmission shift control system comprising:
  a transmission driven by the motor, said transmission having:
    a first gear;
    a second gear;
    a first clutch arrangement associated with said first gear; and
    a second clutch arrangement associated with said second gear;

wherein the transmission shift control system is configured to execute the steps of:
  initiating a shift from said first gear to said second gear in the transmission;
  disengaging said first clutch associated with said first gear;
  engaging said second clutch associated with said second gear; and
  actively modifying at least one of a displacement of said pump and a displacement of said motor while at least one of said disengaging step and said engaging step are being carried out;

wherein said transmission shift control system is further configured to carry out the step of calculating pump commands and motor commands dependent upon a feedback signal of at least one of a speed of the vehicle, an acceleration of the vehicle and an engine speed, said pump commands and said motor commands being used to respectively change said pump displacement and said motor displacement; and wherein said calculating step ignores any vehicle velocity or acceleration commands from an operator driving the vehicle.

13. The transmission shift control system of claim 12, wherein said actively modifying step actively modifies both said pump displacement and said motor displacement while said disengaging step and said engaging step are being carried out.

14. The transmission shift control system of claim 12, wherein said calculating step accommodates an acceleration change undertaken prior to said initiating step being executed.

* * * * *